US008836476B2

(12) United States Patent
Campbell et al.

(10) Patent No.: US 8,836,476 B2
(45) Date of Patent: Sep. 16, 2014

(54) WIRELESS LIGHT CONTROLLER SYSTEM AND METHOD

(75) Inventors: Gregory Campbell, Walpole, MA (US); Francois-Xavier Souvay, Boucherville (CA)

(73) Assignee: Lumenpulse Lighting, Inc. (CA)

( * ) Notice: Subject to any disclaimer, the term of this patent is extended or adjusted under 35 U.S.C. 154(b) by 29 days.

(21) Appl. No.: 13/344,266

(22) Filed: Jan. 5, 2012

(65) Prior Publication Data

US 2012/0274234 A1 Nov. 1, 2012

(51) Int. Cl.

| | |
|---|---|
| ***G05B 19/00*** | (2006.01) |
| ***G05B 23/00*** | (2006.01) |
| ***H05B 37/02*** | (2006.01) |

(52) U.S. Cl.

CPC ........ *H05B 37/0272* (2013.01); *H05B 37/0263* (2013.01); *H05B 37/0245* (2013.01)

USPC ........................................ 340/5.61; 340/5.64

(58) Field of Classification Search

USPC ............. 315/58–159; 340/5.64, 12.28, 12.29, 340/12.3, 12.51, 12.52, 12.23, 13.23, 13.24, 340/13.26

See application file for complete search history.

(56) References Cited

U.S. PATENT DOCUMENTS

| | | | | |
|---|---|---|---|---|
| 7,211,968 | B2 | 5/2007 | Adamson et al. | |
| 7,598,844 | B2 | 10/2009 | Corcoran et al. | |
| 7,904,631 | B2 | 3/2011 | Pham et al. | |
| 7,986,701 | B2 | 7/2011 | Kore et al. | |
| 2002/0027504 | A1 | 3/2002 | Davis et al. | |
| 2004/0047335 | A1 | 3/2004 | Proctor, Jr. et al. | |
| 2006/0209857 | A1 | 9/2006 | Hicks, III | |
| 2006/0286927 | A1 | 12/2006 | Berkman | |
| 2008/0109581 | A1 | 5/2008 | Pham et al. | |
| 2008/0130640 | A1 | 6/2008 | Hurwitz et al. | |
| 2009/0251072 | A1 | 10/2009 | Barnett et al. | |
| 2009/0278479 | A1 | 11/2009 | Platner et al. | |
| 2011/0051721 | A1 | 3/2011 | Brothwell et al. | |
| 2011/0140611 | A1 | 6/2011 | Elek et al. | |
| 2011/0175553 | A1* | 7/2011 | Sampsell | 315/312 |
| 2011/0184577 | A1* | 7/2011 | Ilyes | 700/295 |
| 2011/0204778 | A1* | 8/2011 | Sadwick et al. | 315/34 |
| 2011/0215735 | A1* | 9/2011 | Herbst et al. | 315/297 |
| 2011/0235325 | A1* | 9/2011 | Ramer et al. | 362/235 |
| 2011/0288658 | A1* | 11/2011 | Walters et al. | 700/12 |

FOREIGN PATENT DOCUMENTS

| | | | |
|---|---|---|---|
| EP | 0359178 | A2 | 3/1990 |
| KR | 101100228 | B1 | 12/2011 |
| WO | 2009103245 | A1 | 8/2009 |
| WO | 2011094837 | A1 | 8/2011 |

* cited by examiner

*Primary Examiner* — Minh D A

(74) *Attorney, Agent, or Firm* — Burns & Levinson, LLP; Joseph M. Maraia

(57) ABSTRACT

In some examples, wireless light controller technology includes methods and apparatuses. In other examples, the technology includes one or more lights on a power line. Each light of the one or more lights is individually controllable via power line communication over the power line. The technology further includes a wireless device configured to transmit wireless communication. The wireless communication includes instructions to control the one or more lights. The technology further includes a wireless light controller configured to receive the wireless communication and transmit the instructions to control the one or more lights over the power line communication to the one or more lights.

18 Claims, 5 Drawing Sheets

100

200

WIRELESS LIGHT CONTROLLER SYSTEM AND METHOD

BACKGROUND

Light fixtures are, generally, hard-wired directly to light controllers. However, due to the limited ability to retrofit wires in a building, the hard-wired connections are challenging, if not impossible, to re-configure in real-time. In some installations, the light fixtures are wirelessly connected to light controllers. However, due to the number of light fixtures in a typical building, the wireless connections between individual light fixtures can cause wireless communication collisions and increased latency, thereby causing delays in a light fixture's response to a control input. Thus, a need exists in the art for improved wireless light controller processes and apparatuses for a light system with the features as described herein.

SUMMARY

As a general overview of wireless light controller processes and apparatuses for a light system (hereinafter referred to as "technology"), the technology includes a wireless light controller that communicates with one or more individually controllable lights via power line communication over a power line and communicates with a wireless device via wireless communications. For example, a wireless controller (e.g., mobile phone, personal computing device, etc.) transmits a wireless communication including an instruction to change a color temperature for lights A-G. The wireless light controller receives the wireless communication and converts the wireless communication to a power line communication with the instruction to change the color temperature for lights A-G. The power line communication can include the individual addresses for lights A-G to direct the power line communication to the correct lights. The lights A-G receive the power line communication and respond to the instruction to change the color temperature of the light A-G. In this regard, the wireless light controller can advantageously enable the conversion of wireless communication (in this example, an inherently fast protocol with a high bandwidth capacity with quality control features) to power line communication (in this example, an inherently slow protocol with a low bandwidth capacity with limited quality control features), thereby increasing the available uses for light fixtures and decreasing the installation time for light systems.

One approach to a wireless light controller is a system that includes one or more lights on a power line. Each light of the one or more lights is individually controllable via power line communication over the power line. The system further includes a wireless device configured to transmit wireless communication. The wireless communication includes instructions to control the one or more lights. The system further includes a wireless light controller configured to receive the wireless communication and transmit the instructions to control the one or more lights over the power line communication to the one or more lights.

Another approach to a wireless light controller is a method that controls a wireless light. The method includes transmitting wireless communication. The wireless communication includes instructions to control the one or more lights. The method further includes receiving the wireless communication. The method further includes transmitting the instructions to control the one or more lights over the power line communication to the one or more lights.

Another approach to controlling a wireless light is a wireless light controller that includes a wireless transceiver configured to receive wireless communication from a wireless controller. The wireless communication includes instructions for control of one or more lights. The wireless light controller includes a power line transceiver configured to transmit power line communication to the one or more lights. The power line communication includes the instructions to control the one or more lights. The wireless light controller includes a light instruction module configured to identify a first instruction to control of the one or more lights in the wireless communication and generate the power line communication based on the first instruction to control the one or more lights.

Another approach to controlling a wireless light is a method that includes receiving wireless communication from a wireless controller. The wireless communication includes instructions for control of one or more lights. The method further includes identifying a first instruction to control of the one or more lights in the wireless communication. The method further includes generating the power line communication based on the first instruction to control the one or more lights. The method further includes transmitting power line communication to the one or more lights. The power line communication includes the instructions to control the one or more lights.

Any of the approaches described herein can include one or more of the following examples.

In some examples, the one or more lights are individually addressable to control the one or more lights.

In other examples, the instructions to control the one or more lights include one or more addresses for individual lights in the one or more lights.

In some examples, the wireless light controller is further configured to transmit the power line communication to a light in the one or more lights based on a light address associated with the light.

In other examples, the instructions to control the one or more lights include a color temperature instruction for at least one of the one or more lights.

In some examples, the color temperature instruction includes individual intensity instructions for one or more color temperature light emitting diodes (LEDs) in the one or more lights.

In other examples, the wireless light controller is further configured to receive second instructions to control the one or more lights over the power line communication from the one or more lights and transmit second wireless communication based on the second instructions. In some examples, the wireless device is further configured to receive the second wireless communication. The second wireless communication includes the second instructions to control the one or more lights.

In other examples, the wireless light controller is further configured to receive second instructions over the power line communication from the one or more lights. The second instruction includes status information for the one or more lights. In some examples, the wireless light controller is further configured transmit second wireless communication based on the second instructions. In other examples, the wireless device is further configured to receive the second wireless communication. The second wireless communication includes the status information for the one or more lights.

In some examples, the instructions to control the one or more lights include one or more addresses for individual lights in the one or more lights.

In other examples, the method further includes transmitting the power line communication to a light in the one or more lights based on a light address associated with the light.

In some examples, the instructions to control the one or more lights include a color temperature instruction for the one or more lights.

In other examples, the color temperature instruction includes individual intensity instructions for one or more color temperature light emitting diodes (LEDs) in the one or more lights.

In some examples, the light instruction module further configured to identify a second instruction to control the one or more lights in the power line communication, and generate the wireless communication based on the second instruction to control the one or more lights.

In other examples, the light instruction module further configured to identify a second instruction in the power line communication. The second instruction includes status information for the one or more lights. The light instruction module further configured to generate the wireless communication based on the second instruction.

In some examples, the status information includes usage information, temperature information, expected life information, color temperature information, or any combination thereof.

In other examples, the method further includes identifying a second instruction to control the one or more lights in the power line communication, and generating the wireless communication based on the second instruction to control the one or more lights.

In some examples, the method further includes identifying a second instruction in the power line communication, the second instruction comprises status information for the one or more lights, and generating the wireless communication based on the second instruction.

In other examples, the status information includes usage information, temperature information, expected life information, color temperature information, or any combination thereof.

The wireless light controller systems and methods described herein (hereinafter "technology") can provide one or more of the following advantages. An advantage of the technology is that the use of a wireless device with the power line communication in an existing electrical infrastructure decreases the installation cost of technology, thereby increasing the effective uses of the technology. Another advantage of the technology is that the use of the wireless device with the power line communication increases the user's flexibility and/or range for configuring lights while reducing the installation cost (e.g., reduced cable cost, reduced labor cost, etc.), thereby increasing the effective uses of the technology (e.g., use in retrofits of existing buildings, use in remodels of existing buildings, use in new construction, etc.).

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

As a general overview of wireless light controller processes and apparatuses for a light emitting diode (LED) light system (hereinafter referred to as "technology"), the technology includes a wireless light controller that communicates with one or more individually controllable LEDS lights via power line communication over a power line and communicates with a wireless device via wireless communications. For example, a wireless controller (e.g., mobile phone, personal computing device, etc.) transmits a wireless communication including an instruction to change a color temperature for LED lights A-G.

The wireless light controller receives the wireless communication and converts the wireless communication to a power line communication with the instruction to change the color temperature for LED lights A-G. The power line communication can include the individual addresses for LED lights A-G to direct the power line communication to the correct lights to change the color temperature (e.g., change the color temperature of the lights to 2700 Kelvin, change the color temperature to 4500 Kelvin, change the color temperature to 6000 Kelvin, etc.). The LED lights A-G receive the power line communication and respond to the instruction to change the color temperature. In this regard, the wireless light controller can advantageously enable the conversion of wireless communication (in this example, an inherently fast protocol with a high bandwidth capacity with particular quality control features) to power line communication (in this example, an inherently slow protocol with a low bandwidth capacity with other types of quality control features), thereby increasing the available uses for light fixtures and decreasing the installation time for light systems.

Another advantage of the technology is that the transition between wireless communication and power line communication is transparent to the end user controlling the light systems, thereby decreasing configuration time and increasing customer satisfaction with the configuration of the light system. Another advantage of the technology is that the conversion between wireless communication and power line communication advantageously bridges communication between two different types of communication techniques, thereby increasing the usability of the portable configuration functionality of the technology.

Figure 1:
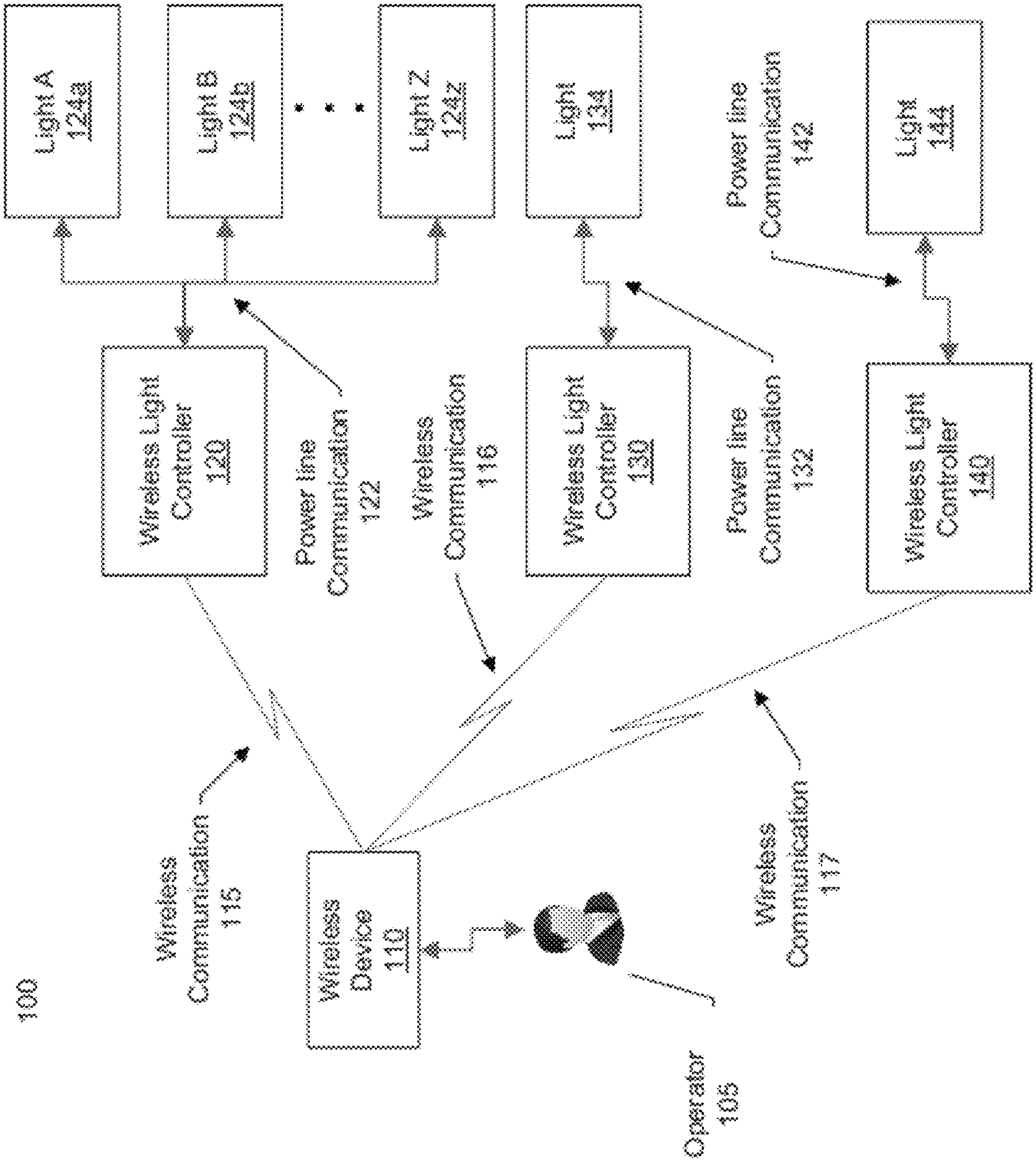
FIG. 1 is a block diagram of an exemplary lighting environment.

FIG. 1 is a block diagram of an exemplary lighting environment 100. The environment 100 includes a wireless device 110, a plurality of wireless light controllers 120, 130, and 140, and a plurality of lights A 124, B 124*b* through Z 124*z*, 134, and 144. The wireless device 110 is operated by an operator 105 (e.g., input light controls, adjust light controls, input light addresses, etc.) and transmits wireless communication 115, 116, and 117 (e.g., instructions to control a light, instructions in response to a control of a light, etc.) to the wireless light controller 120, 130, and 140, respectively. The wireless light controller 120, 130, and 140 convert the wireless communication 115, 116, and 117, to power line communication 122, 132, and 142, respectively, and transmit the power line communication 122, 132, and 142 to the lights A 124, B 124*b* through Z 124*z*, 134, and 144, respectively. Each of the lights A 124, B 124*b* through Z 124*z*, 134, and 144 is individually addressable based on a light address. The conversion of the wireless communication to power line communication advantageously decreases the installation cost of the light control system by decreasing the cost to install and maintain wires between the controlling device (in this example, the wireless device) and the lights.

In operation, the wireless device 100 communicates with the wireless light controllers 120, 130, and 140 via wireless communication 115, 116, and 117, respectively (e.g., 802.11 protocol, wireless mesh network, wireless network, cellular network, etc.). The wireless light controllers 120, 130, and 140 convert (e.g., embed the instructions in power line communication, extract the instructions from the wireless communication and generate a power line communication, etc.) the wireless communication 115, 116, and 117 to power line communication 122, 132, and 142, respectively. The conversion of the wireless communication into power line communication advantageously enables the integration of portable, handheld control of lights into existing power line control infrastructure, thereby reducing the maintenance and control costs for a light system. The conversion of the wireless communication into power line communication advantageously increases the flexibility of the light system by enabling portable, handheld control of the lights using existing power line control infrastructure.

The wireless light controllers 120, 130, and 140 communicate the power line communication 122, 132, and 142 (e.g., amplitude modulation, digital power line carrier, pulse-position modulation, etc.) to the lights A 124, B 124*b* through Z 124*z*, 134, and 144, respectively. The wireless light controller 120 transmits the power line communication 122 to the lights A 124*a*, B 124*b* through Z 124*z*. The wireless light controller 130 transmits the power line communication 132 to the light 134. The wireless light controller 140 transmits the power line communication 142 to the light 144.

In other examples, the conversion between wireless communication and power line communication can include identification of the instructions within the wireless communication, identification of the addresses for the lights being controlled by the instructions within the wireless communication, and generation of the power line communication based on the instructions, addresses, and/or protocol information associated with the power line communication (e.g., amplitude format, quality control requirements, etc.). In some examples, the conversation between wireless communication and power line communication further includes receiving a plurality of wireless packets and determining when the instructions for particular lights are complete (e.g., all of the wireless packets that include instructions have been received, enough of the wireless packets have been received to generate the power line communication, etc.).

In some examples, the lights A 124, B 124*b* through Z 124*z*, 134, and 144 communicate power line communication 122, 132, and 142 to the wireless light controllers 120, 130, and 140, respectively. The wireless light controllers 120, 130, and 140 can convert the power line communication 122, 132, and 142 to wireless communication 115, 116, and 117, respectively, and communicate the wireless communication 115, 116, and 117 to the wireless device 110. The wireless device 110 can display and/or provide feedback of the power line communication to the operator 105.

In other examples, the conversion between power line communication and wireless communication can include identification of the instructions within the power line communication, identification of the addresses for the lights being controlled by the instructions within the power line communication, and generation of the wireless communication based on the instructions, addresses, and/or protocol information associated with the wireless communication (e.g., packet format, quality control requirements, etc.). In other examples, the conversation between power line communication and wireless communication further includes receiving a plurality of power line packets and determining when the instructions for particular lights are complete (e.g., all of the power line packets that include instructions have been received, enough of the power line packets have been received to generate the wireless communication, etc.).

In other examples, the lights A 124, B 124*b* through Z 124*z*, 134, and 144 are individually addressable for control of the lights. The individual control of one or more of the lights advantageously enables the operator 105 and/or the wireless device 110 to control a subset of the lights via a portable, handheld device. In some examples, the wireless light controller 120, 130, or 140 transmits the power line communication 122, 132, or 142 to a light in the one or more lights based on a light address associated with the light. In other words, the individualized addressing of the lights enables the wireless light controllers 120 to focus control activities on the lights that are being controlled by the instructions.

In some examples, the instructions to control the one or more lights include one or more addresses for individual lights in the one or more lights. The wireless device 110 can include the addresses for the individual lights in the wireless communication 115, 116, or 117. The wireless light controller 120, 130, or 140 can identify the addresses for the individual lights in the wireless communication 115, 116, or 117 and can include the addresses for the individual lights in the power line communication 122, 132, or 142. In other words, the power line communication 122, 132, or 142 can include individual addresses for a subset of the lights for individualized control of the particular lights (e.g., reduce the intensity of half of the lights, change the color temperature for every third light in a light array, etc.).

In other examples, the instructions to control the one or more lights include a color temperature instruction for at least one of the one or more lights. In some examples, the color temperature instruction includes individual intensity instructions for one or more color temperature light emitting diodes (LEDs) in the one or more lights.

In other examples, the wireless communication includes any type of network protocol (e.g., wifi, code division multiple access (CDMA), time-division multiplexing (TDM), etc.). For example, the wireless communication is in a transmission control protocol (TCP)/internet protocol (IP). In this example, the wireless light controller converts the TCP/IP wireless communication into a carrier wave modulation power line communication. Table 1 illustrates exemplary conversions between wireless communication and power line communication.

TABLE 1

| Exemplary Conversion | | | |
|---|---|---|---|
| Wireless Communication Instruction | Wireless Communication Type | Power Line Communication Instruction | Power Line Communication Type |
| Turn Lights to 50% Intensity | TCP/IP packet | Turn Lights to 50% Intensity | Pulse-Position Modulation |
| Change the Color Temperature of the Lights | User datagram protocol (UDP) packet | Change the Color Temperature of the Lights | Distribution Line Carrier |

TABLE 1-continued

| Exemplary Conversion | | | |
|---|---|---|---|
| Wireless Communication Instruction | Wireless Commu-nication Type | Power Line Communication Instruction | Power Line Commu-nication Type |
| Change the Position of the Lights | Real-time transport protocol (RTP) packet | Change the Position of the Lights | Amplitude Modulation |
| Turn Every other Light Off | Wifi packet | Turn Every other Light Off | Pulse Modulation |

Although FIG. 1 illustrates the operator 105 utilizing the wireless device 110 to control the lights, the wireless device 110 can control the lights based on any type of automated control techniques. For example, the wireless device 110 can include a light sensor and can control the lights based on the light detected by the light sensor. As another example, the wireless device 110 can include a time schedule program and can control the lights based on the time schedule program (e.g., turn the lights on at a certain time, turn the lights to 50% intensity based on pre-determined conditions, etc.).

Figure 2:
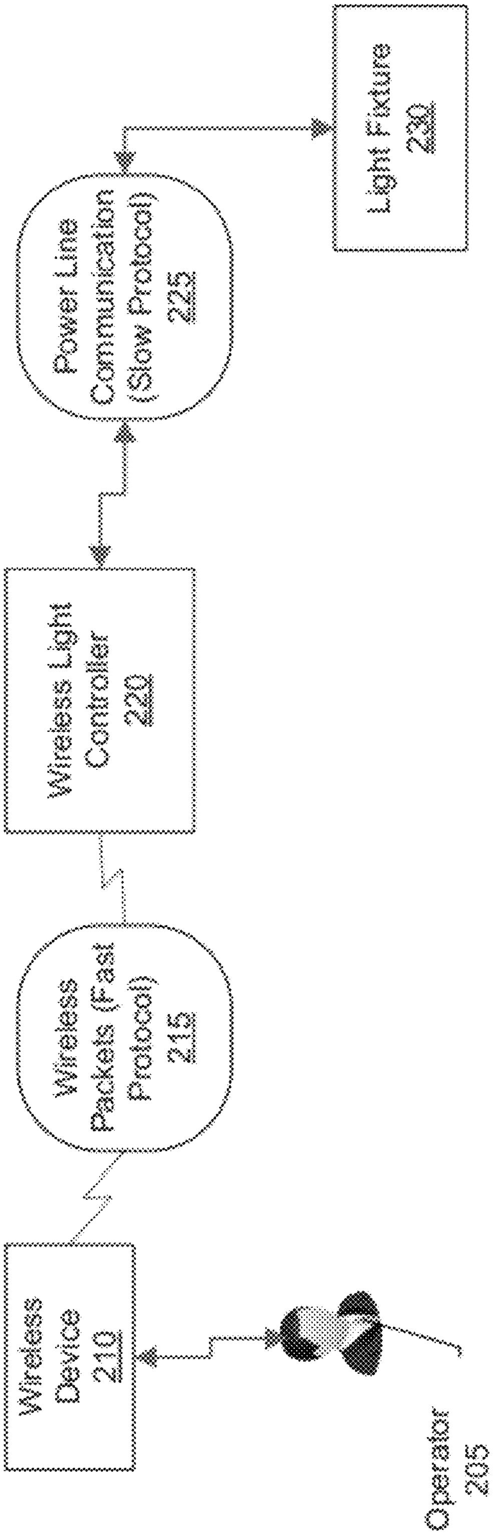
FIG. 2 is a block diagram of another exemplary lighting environment.

FIG. 2 is a block diagram of another exemplary lighting environment 200. The environment 200 includes a wireless device 210, a wireless light controller 220, and a light fixture 230. An operator 205 can modify a setting (e.g., intensity, color temperature, aperture, etc.) for the light fixture 230 using the wireless device 210. The wireless device 210 receives the instructions to control the light fixture 230 from the operator 205 (e.g., moving a switch, change a setting on a graphical user interface, etc.). The wireless device 210 transmits the instructions via wireless packets 215 to the wireless light controller 220. The wireless light controller 220 converts the wireless packets 215 to a power line communication 225. The wireless light controller 220 transmits the power line communication 225 to the light fixture 230.

In this example, the wireless packets 215 are a fast protocol (e.g., 1.5 megabytes per second, 100 megabytes per second, etc.) and the power line communication 225 is a slow protocol (e.g., 570 kilobits per second, 200 kilobits per second, etc.). In other words, the wireless light controller 220 converts an inherently fast protocol with particular types of quality control characteristics (e.g., error control, transmission control, active acknowledgment of receipt, etc.) to an inherently slow protocol with limited quality control characteristics (e.g., multiple re-sends to avoid lost packets, passive acknowledge of receipt, etc.). The technology can advantageously handle both types of quality control characteristics (i.e., the quality control characteristics of the wireless communication and the quality control characteristics of the power line communication), thereby reducing communication losses associated with wireless communication (e.g., packet collisions, channel latency, etc.) and power line communication (e.g., electrical interference, magnetic interference, etc.). The wireless light controller 220 can remove the quality control characteristics and/or insert other types of quality control characteristics to the power line communication. The conversion between a fast protocol and a slow protocol advantageously enables the technology to utilize existing technology (e.g., power lines, light systems, etc.) with portable control techniques (e.g., wireless device communicating via wireless communication, an operator walking around an art museum adjusting light intensities, etc.).

For example, the wireless light controller 220 receives TCP/IP packets from the wireless device 210 and acknowledges receipt of the TCP/IP packets to ensure quality control of the communication. In this example, after receiving the TCP/IP packets, the wireless light controller 220 determines the instructions to control the light fixture 230 and generates a power line communication (e.g., a set of amplitude modulations for the instructions, a digital modulation for the instructions, etc.). The generated power line communication includes the instructions to control the light fixture 230.

In some examples, the light fixture 230 transmits the power line communication 225 to the wireless light controller 220. The wireless light controller 220 converts the power line communication 225 to the wireless packets 215 and transmits the wireless packets 215 to the wireless device 210. In this example, the power line communication 225 and the wireless packets 215 include instructions which include status information for the light fixture 230. For example, the status information includes that the lights are at 50% intensity and are running at 87 degrees Celsius. As another example, the status information includes that the lights are at 78% operational life expectancy.

For example, the wireless light controller 220 receives a wireless communication (in this example, a set of attached resource computer network (arcnet) packets) from the wireless controller 210. The wireless light controller 220 identifies a DMX512 instruction within the wireless communication by analyzing the packet headers of the wireless communication. In this example, the wireless light controller 220 identifies a DMX512 "Start Code" in the wireless communication.

As another example, the wireless light controller 220 receives a wireless communication (in this example, a set of TCPI/IP packets) from the wireless controller 210. The wireless light controller 220 identifies a remote device management (RDM) instruction within the wireless communication by analyzing the packet format of the wireless communication. In this example, the wireless light controller 220 identifies a universe of the RDM protocol from the wireless communication. The wireless light controller 220 utilizes the identified universe during the conversion of the wireless communication to the power line communication (in other words, the power line communication is directed to the appropriate lights within the universe).

In some examples, the wireless light controller 220 stores, via a storage device, a plurality of wireless communication and/or power line communication. The wireless light controller 220 can group instructions for a light, a set of lights, and/or lights associated with a power line together to reduce the communication overhead associated with establishing a communication channel (e.g., wireless communication channel, power line communication channel, etc.). In other examples, the wireless light controller 220 receives an instruction for a set of lights A and holds the instruction for the set of lights A for a set time period (e.g., 10 milliseconds, 1 second, etc.), a dynamic time period (e.g., average time period between instructions, time from last instruction, etc.) and/or any other type of parameter (e.g., predetermined number of instructions, predetermined number of lights being addressed by the instructions, dynamic percentage of lights being addressed, etc.). For example, the wireless light controller 220 receives five instructions for a set of lights B via wireless communication, groups the five instructions together (e.g., one packet with all five instructions, two packets with the five instructions split between the two packets, etc.), and transmits the grouped instructions to the set of lights via power line communication.

Figure 3:
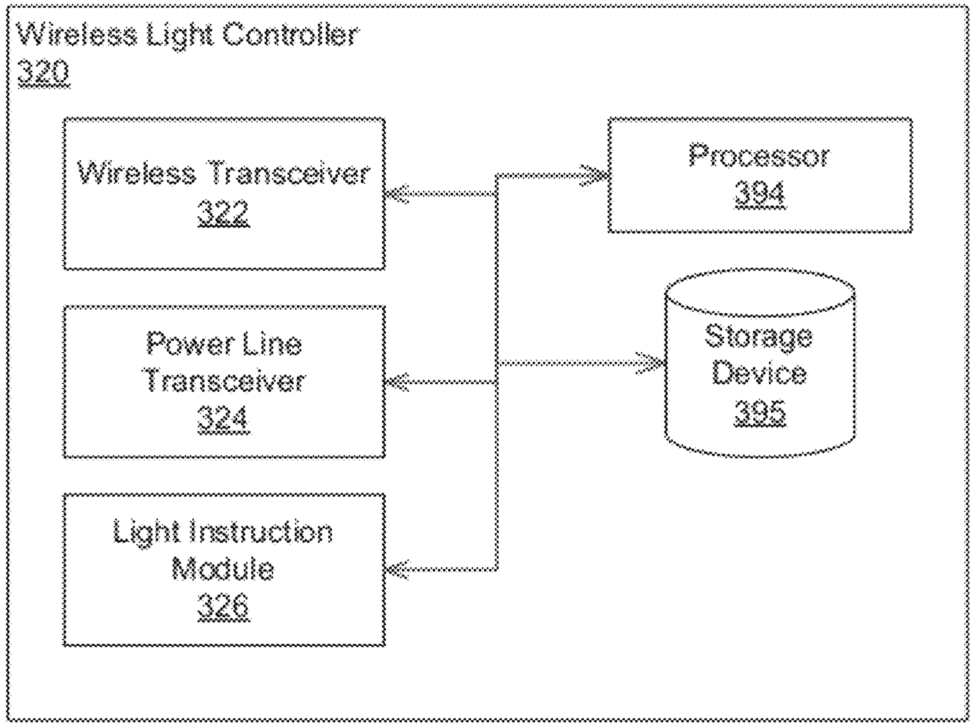
FIG. 3. is a block diagram of an exemplary wireless light controller.

FIG. 3. is a block diagram of an exemplary wireless light controller 320. The wireless light controller 320 includes a wireless transceiver 322, a power line transceiver 324, a light instruction module 326, a processor 394, and a storage device 395. The modules and devices described herein can, for example, utilize the processor 394 to execute computer executable instructions and/or the modules and devices described herein can, for example, include their own processor to execute computer executable instructions (e.g., a protocol processing unit, a field programmable gate array processing unit). It should be understood the wireless light controller 320 can include, for example, other modules, devices, and/or processors known in the art and/or varieties of the illustrated modules, devices, and/or processors.

The wireless transceiver 322 receives wireless communication from a wireless controller. The wireless communication includes instructions for control of one or more lights. The power line transceiver 324 transmits power line communication to the one or more lights. The power line communication includes the instructions to control the one or more lights.

The light instruction module 326 identifies an instruction to control of the one or more lights in the wireless communication and generates the power line communication based on the instruction to control the one or more lights. In some examples, the light instruction module is further configured to identify another instruction to control the one or more lights in the power line communication and generate the wireless communication based on the other instruction to control the one or more lights.

In other examples, the light instruction module identifies another instruction in the power line communication. The other instruction includes status information for the one or more lights. In some examples, the light instruction module generates the wireless communication based on the other instruction.

In some examples, the instructions to control the one or more lights include a color temperature instruction for the one or more lights. In other examples, the color temperature instruction includes individual intensity instructions for one or more color temperature light emitting diodes (LEDs) in the one or more lights. In some examples, the status information includes usage information (e.g., 1134 hours of usage, 45 kilowatts of power used, etc.), temperature information (e.g., operating between 65-75 degrees Celsius, highest operating temperature of 78 degrees Celsius, etc.), expected life information (e.g., 34 hours of usage remaining, 56 days of usage remaining, etc.), and/or color temperature information (e.g., current color temperature setting, previous five color temperature settings, etc.).

The processor 394 executes the operating system and/or any other computer executable instructions for the wireless light controller 320 (e.g., executes applications). The storage device 395 stores light information and/or control information (e.g., light fixture serial number, light fixture address, light fixture usage, etc.). The storage device 395 can include a plurality of storage devices and/or the wireless light controller 320 can include a plurality of storage devices (e.g., a protocol storage device, an instruction storage device). The storage device 395 can include, for example, long-term storage (e.g., a hard drive, a tape storage device, flash memory), short-term storage (e.g., a random access memory, a graphics memory), and/or any other type of computer readable storage.

Figure 4:
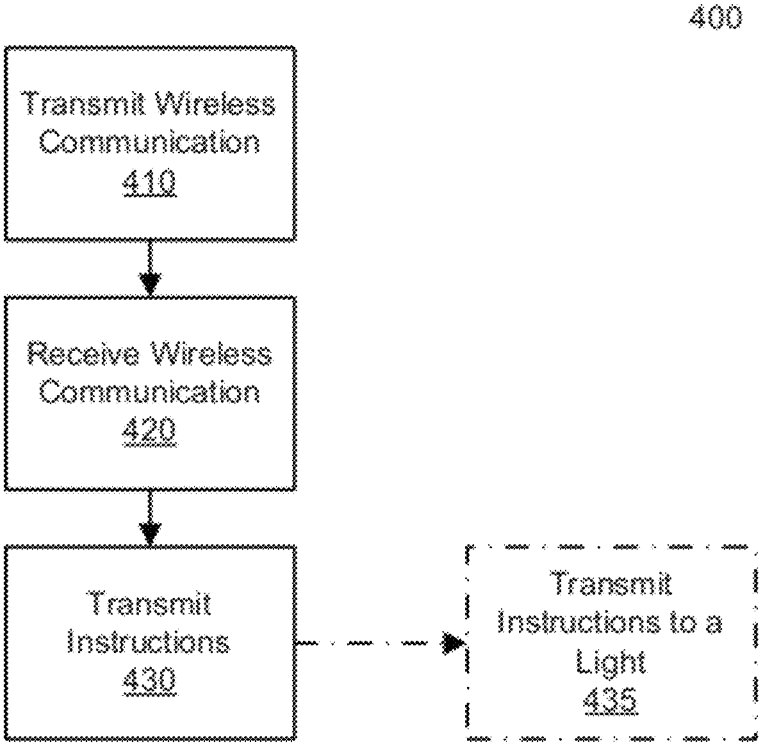
FIG. 4 is a process diagram of an exemplary wireless light controller method.

FIG. 4 is a process diagram of an exemplary wireless light controller method 400 utilizing, for example, the wireless device 210 of FIG. 2 and the wireless light controller 220 of FIG. 2. The wireless device 210 transmits (410) wireless communication to the wireless light controller 220. The wireless communication includes instructions to control the one or more lights (e.g., the light fixture 230). The wireless light controller 220 receives (420) the wireless communication. The wireless light controller 220 transmits (430) the instructions to control the one or more lights over the power line communication to the light fixture 230.

In some examples, the instructions to control the one or more lights include one or more addresses for individual lights in the one or more lights. In other examples, the wireless light controller 220 transmits (435) the power line communication to a particular light in the light fixture 420 based on a light address associated with the light. The addressing of a particular light advantageously enables the technology to reduce energy consumption and decrease maintenance costs by focusing the control of the lights on particular lights (e.g., light focused on a particular art work, lights outlining a door, etc.).

Figure 5:
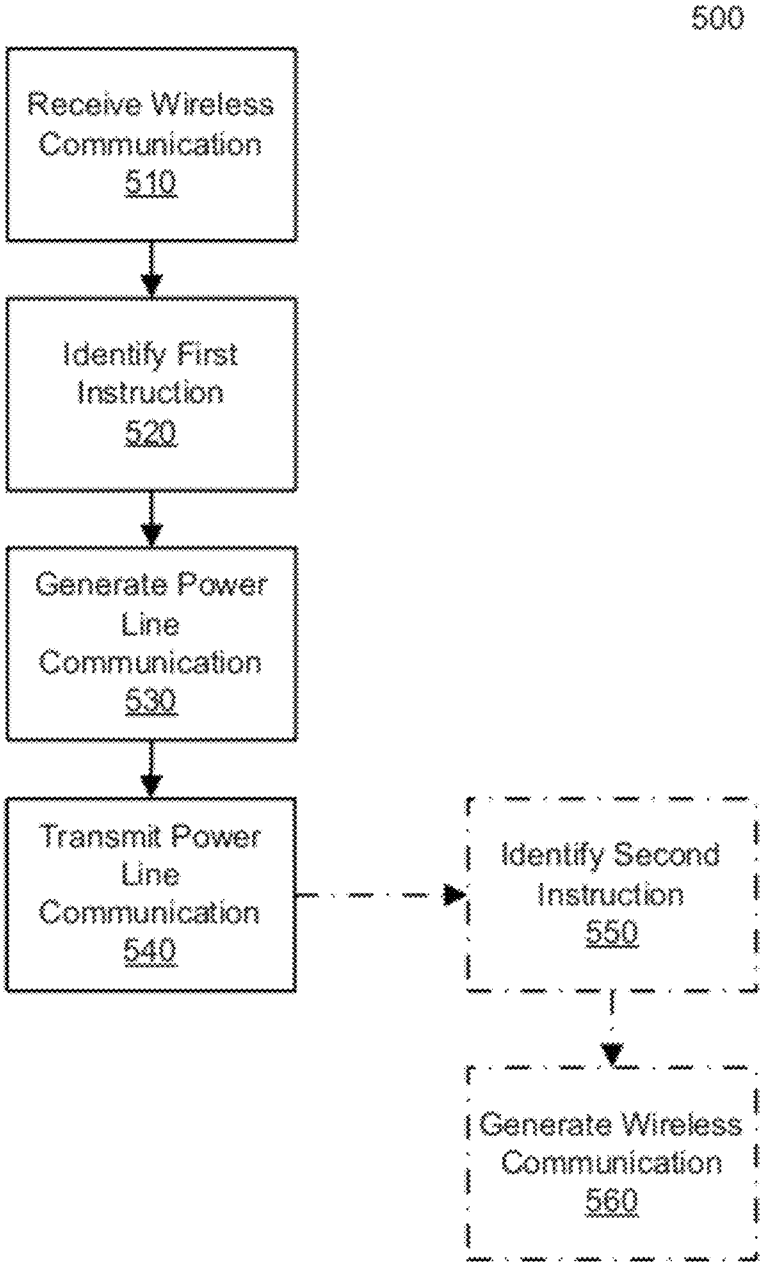
FIG. 5 is a flowchart of another exemplary wireless light controller method.

FIG. 5 is a flowchart of another exemplary wireless light controller method 500 utilizing, for example, the wireless light controller 220 of FIG. 2. The wireless light controller 220 receives (510) wireless communication from a wireless controller (e.g. the wireless controller 210 of FIG. 2). The wireless communication includes instructions for control of one or more lights. The wireless light controller 220 identifies (520) a first instruction to control of the one or more lights in the wireless communication. The wireless light controller 220 generates (530) the power line communication based on the first instruction to control the one or more lights. The wireless light controller 220 transmits (540) the power line communication to the one or more lights. The power line communication includes the instructions to control the one or more lights.

In some examples, the wireless light controller 220 identifies (550) a second instruction to control the one or more lights in the power line communication. The wireless light controller generates (560) the wireless communication based on the second instruction to control the one or more lights.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A wireless light controller system, comprising:

one or more lights on a power line, each light of the one or more lights being individually controllable via power line communication over the power line;

a wireless device configured to transmit wireless communication, wherein the wireless communication comprises instructions to control the one or more lights; and a wireless light controller configured to receive the wireless communication and transmit the instructions to control the one or more lights over the power line, further configured to receive information over the power line from the one or more lights, wherein the information comprises status information for the one or more lights and the status information comprises usage information, temperature information, expected life information, color temperature information, or any combination thereof.

2. The wireless light controller system of claim 1, wherein the one or more lights are individually addressable to control the one or more lights.

3. The wireless light controller system of claim 2, wherein the instructions to control the one or more lights comprise one or more addresses for individual lights in the one or more lights.

4. The wireless light controller system of claim 1, further comprising the wireless light controller further configured to transmit the power line communication to a light in the one or more lights based on a light address associated with the light.

5. The wireless light controller system of claim 1, wherein the instructions to control the one or more lights comprise a color temperature instruction for at least one of the one or more lights.

6. The wireless light controller system of claim 5, wherein the color temperature instruction comprises individual intensity instructions for one or more color temperature light emitting diodes (LEDs) in the one or more lights.

7. The wireless controller system of claim 1, wherein the wireless communication is a first wireless communication, and wherein the wireless light controller is further configured to generate second wireless communication based on the received information and the wireless device is further configured to receive the second wireless communication and based on the second wireless communication generate second instructions to control the one or more lights.

8. The wireless controller system of claim 1, wherein the wireless device is further configured to receive second wireless communication, and wherein the second wireless communication comprises the status information for the one or more lights.

9. A wireless light controller, comprising:

a wireless transceiver configured to receive wireless communication from a wireless controller, wherein the wireless communication comprises instructions for control of one or more lights;

a power line transceiver configured to transmit power line communication to the one or more lights, wherein the power line communication comprises the instructions to control the one or more lights; and a light instruction module configured to:

identify instruction to control the one or more lights in the wireless communication, and generate the power line communication based on the instruction to control the one or more lights, wherein the power line transceiver is further configured to receive information over the power line from the one or more lights, wherein the received information comprises status information for the one or more lights, and the status information comprises usage information, temperature information, expected life information, color temperature information, or any combination thereof.

10. The wireless light controller of claim 9, wherein the instructions to control the one or more lights comprise a color temperature instruction for the one or more lights.

11. The wireless light controller of claim 10, wherein the color temperature instruction comprises individual intensity instructions for one or more color temperature light emitting diodes (LEDs) in the one or more lights.

12. The wireless light controller of claim 9, wherein the light instruction module is further configured to:

identify a second instruction to control the one or more lights in the power line communication, and generate the wireless communication based on the second instruction to control the one or more lights.

13. The wireless light controller of claim 9, wherein the wireless transceiver is further configured to:

generate second wireless communication based on the status information.

14. A method for controlling a wireless light, comprising:

receiving wireless communication from a wireless controller, wherein the wireless communication comprises instructions for control of one or more lights;

identifying instruction to control the one or more lights in the wireless communication;

generating power line communication based on the instruction to control the one or more lights;

transmitting the power line communication to the one or more lights, wherein the power line communication comprises the instructions to control the one or more lights; and receiving information over the power line from the one or more lights, wherein the received information comprises status information for the one or more lights, and the status information comprises usage information, temperature information, expected life information, color temperature information, or any combination thereof.

15. The method of claim 14, wherein the wireless communication is a first wireless communication and the instruction is a first instruction and the method further comprises:

identifying a second instruction to control the one or more lights in the information received over the power line, and generating second wireless communication based on the second instruction to control the one or more lights.

16. The method of claim 14, further comprising:

generating second wireless communication based on the information received over the power line.

17. The method of claim 14, wherein the instructions to control the one or more lights comprise one or more addresses for individual lights in the one or more lights.

18. The method of claim 14, further comprising:

transmitting the power line communication to a light in the one or more lights based on a light address associated with the light.

* * * * *